United States Patent [19]

Rebourg

[11] 4,245,330

[45] Jan. 13, 1981

[54] ELASTIC SURFACE WAVE HADAMARD TRANSFORMER

[76] Inventor: Jean-Claude Rebourg, 95, Ave. de la Clairiere, 78120 Rambouillet, France

[21] Appl. No.: 952,680

[22] Filed: Oct. 23, 1978

[30] Foreign Application Priority Data

Oct. 24, 1977 [FR] France .............................. 77 32539

[51] Int. Cl.[3] .......................... G06G 7/12; H04N 3/14

[52] U.S. Cl. .................................... 364/826; 358/133; 358/138; 364/821; 364/861

[58] Field of Search ............... 364/826, 604, 827, 824, 364/861, 727; 333/150, 151, 154, 165, 166; 358/13, 133, 138

[56] References Cited

U.S. PATENT DOCUMENTS

| | | | |
|---|---|---|---|
| 3,818,348 | 6/1974 | Puente | 364/824 |
| 3,859,515 | 1/1975 | Radcliffe, Jr. | 364/727 |
| 3,899,666 | 8/1975 | Bolger | 364/821 |
| 4,054,909 | 10/1977 | Kojima et al. | 358/13 |
| 4,099,250 | 7/1978 | Finnila et al. | 364/862 |
| 4,134,134 | 1/1979 | Lux | 358/133 X |

OTHER PUBLICATIONS

Maines et al.: Surface-Acoustic-Wave Devices for Signal Processing Application; Proceedings of the IEEE, May 1976, pp. 639-652.

Henaff: Image Processing Using Acoustic Surface Waves; Electronics Letters, 8 Mar. 1973, vol. 9, No. 5, pp. 102-104.

Grant et al.: Programmable Transversal Filtering Using the Surface-Acoustic-Wave Diode Convolver; Wave Electronics 1974/76, pp. 381-386.

*Primary Examiner*—Felix D. Gruber
*Attorney, Agent, or Firm*—Laff, Whitesel & Rockman

[57] ABSTRACT

An elastic surface wave transformer comprises a receiver transducer and an emitter transducers on a substrate capable of transmitting elastic surface waves. The transformer comprises a single track and the emitter transducers are arranged behind one another at a distance equal to the path traversed by a sample during a sampling period. The electrodes of the transducers are designed to transmit in phase or in phase opposition the samples that are applied externally thereto, so as to obtain the coefficients of the Hadamard transform.

The transformer can be used in particular for transmitting images.

16 Claims, 11 Drawing Figures

| TA.1 | | | | TB.1 | | | | | | |
|---|---|---|---|---|---|---|---|---|---|---|
| + | + | + | + | + | + | + | + | | | |
| + | − | + | − | | − | + | − | + | | |
| + | + | − | − | | | − | − | + | + | |
| + | − | − | + | | | | + | − | − | + |

ELASTIC SURFACE WAVE HADAMARD TRANSFORMER

The present invention relates to improvements in elastic surface wave Hadamard transformers. It concerns more particularly elastic surface wave Hadamard transformers that can be used to produce a direct transformation of a TV picture before being coded for transmission. On reception and after decoding, they produce the inverse transformation so as to restore the TV picture.

The Hadamard transformation, also known by the term "Walsh transformation", is of great interest in the transmission of TV pictures since it enables the information being transmitted to be compressed. Further information on this subject may, for example, be obtained from the article by J. Poncin entitled "Utilisation de la transformation de Hadamard pour le codage et la compression des signaux d'images" (Use of the Hadamard transformation to code and compress picture signals). This article appeared in the French technical journal "Annales des Telecommunications", vol. 26, Nos. 7-8, July-August 1971.

Hadamard analogue transformers, which have already been described, process image signals and use multiple tapping delay lines in the form of parallel tracks on an elastic surface wave device. Such a transformer is described in the article by J. Hénaff entitled "Image processing using acoustic surface waves" which appeared in the technical journal "Electronics Letters", vol. 9, No. 5, of 8th Mar. 1973. This transformer has the disadvantage that it delivers the parallel transformed terms on output lines corresponding to the tracks. It has since been proposed to displace the tracks longitudinally or, more simply, displace the tapping points on the tracks so as to obtain the series reading of the transformed terms on a common output line, which enables the transform to be transmitted via a single cable. Nevertheless, these multi-track transformers cause losses since each track captures only a part of the surface wave projected by the emitter comb. In practice, these losses are only slightly proportional to the number of tracks of the transformer. An output amplifier, therefore, has to be provided for each track, which is a problem and results in added background noise that interferes with the performance of the transformer. Moreover, since the output signals of the different tracks should undergo a synchronous demodulation, the phase shifts introduced by these output amplifiers should be identical, which is difficult to achieve at the frequencies in question.

In addition, in the series transformer described above, electron gates must be provided between the common output and the respective outputs of the tracks. These gates conduct in sequence so as to effect a series arrangement of the terms on the common output line. Each gate switching produces commutation peaks, which are interfering signals. The reduction in the number of these gates at the output of the transformer enables the number of interfering signals to be reduced.

One object of the present invention is to provide an elastic surface wave Hadamard transformer for periodic signal samples that delivers the transformed terms in series, does not have the afore-mentioned disadvantages, and that moreover contains the advantages that will be described hereinafter.

According to a characteristic feature of the invention, such a transformer comprises an elastic surface wave device with an emitter transducer for projecting onto a single track, the N samples of the signal being transformed. The single track comprises 2N-1 receiver transducers arranged at an equal distance behind one another, the distance being equal to the path traversed by a sample during a sampling period. The first transformed term is obtained by adding the output signals from the receiver transducers 1 to N once the Nth sample has reached the receiver transducer 1. The second term is obtained by adding the output signals from the receiver transducers 2 to N+1, and so on. The Nth transformed term is obtained by adding the output signals from the receiver transducers N to 2N−1, the addition operations carried out being algebraic. The outputs of the receiver transducers are connected selectively to the inputs of an adder in the sequence indicated, and finally the adder delivers in series the N transformed terms.

According to a further characteristic feature, in a transformer derived from the preceding system, the emitter transducer becomes the receiver transducer, and the receiver transducers become the emitter transducers. The adder becomes a distributor that distributes equally to the inputs of the emitter transducers, which are selectively connected thereto, the powers of the N samples which are applied thereto. The receiver transducer ensures the addition operations previously carried out in the adder and delivers the N transformed terms.

According to yet another characteristic feature, the transformer may be followed by a selective control inverter to reverse the sign of certain transformed terms so as to obtain the true Hadamard transform.

According to another characteristic feature, the transformer is connected in series with a second transformer of the same type. The distance between two receiver transducers (or emitter transducers) is N times greater than in the first transformer.

The characteristic features of the present invention mentioned hereinbefore, as well as other features, will appear more clearly on reading the following description of embodiments of the invention, the description being given in relation to the accompanying drawings in which:

FIG. 1 is a diagram of a Hadamard transformer, according to the invention, in which the true Hadamard transform is produced, FIGS. 2 to 5 illustrate the diagrammatic representations used in the drawings of the examples of an embodiment according to the invention, FIG. 6 is a diagram of a transformer according to the invention that carries out a transform of the Hadamard transform type, FIG. 7 is a diagram of a variant of the transformer of FIG. 6, FIG. 8 illustrates an embodiment of an elastic surface wave device that can be used in the transformer of FIG. 6, FIG. 9 is a diagram of another variant of the transformer of FIG. 6, and FIGS. 10A and 10B (taken together) show a block diagram of a direct image transformer, according to the invention, connected via a transmission line to an inverse transformer that restores the initial image.

The transformer of FIG. 1 comprises a substrate 1 capable of propagating elastic surface waves, on which is provided an input or emitter transducer 2 and seven output or receiver transducers 3 to 9. The transducers 3 to 9 are arranged perpendicularly with respect to the track 10 onto which are projected the surface acoustic waves from the emitter transducer 2. The length of the transducers 3 to 9 is practically the same as that of the transducer 2 in order to occupy the whole width of the track 10. The distance between the transducers 3 to 9 is constant and equal to vT, where v is the velocity of the acoustic waves on the track 10 and T is the period of the sampled signals emitted by the transducer 2. The transducer 2 has a grounded electrode and the other electrode is connected to to the output of a sample generator 11. Each transducer 3 to 9 has a grounded electrode, the other electrode being connected to an electronic contact which forms part of an arrangement of electronic contacts 12. The signal outputs from the arrangement 12 are connected to the inputs of an analogue adding circuit 13. The control signal inputs I, II, III and IV are connected to the outputs of a sequential control circuit 14. The sample generator 11 has a signal input 15 to which is applied the analogue signal being transformed, and a clock input H. The circuit 14 also contains a clock input H.

The transformer of FIG. 1 is designed to transform groups of four signal samples, according to the following equation:

$$\begin{bmatrix} I1 \\ I2 \\ I3 \\ I4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \times \begin{bmatrix} i1 \\ i2 \\ i3 \\ i4 \end{bmatrix} \quad (1)$$

in which i1 to i4 form a group of four samples being transformed, I1 to I4 form the group of the i1 to i4 transforms, and the multiplication matrix of the samples i1 to i4 is a Hadamard matrix. In practice, the transformer of FIG. 1 carries out the matrix multiplication of the equation (1).

The arrangement of electronic contacts 12 comprises the input leads 16 to 22, respectively, connected to the electrodes (not grounded) of the transducers 3 to 9. The input lead 16 is connected to the output lead 23 by a contact I.3. The input lead 17 is connected to the output lead 24 by, on the one hand, a contact I.4 and, on the other hand, by an analogue inverter 30 and a contact II.4 in series. The input lead 18 is connected to the output lead 25 by, on the one hand, the contacts I.5 and II.5 in parallel and, on the other hand, by an analogue inverter 31 and a contact III.5 in series. The input lead 19 is connected to the output lead 26 by, on the one hand, the contacts I.6 and IV.6 in parallel and, on the other hand, by an inverter 32 in series with the contacts II.6 and III.6 in parallel. The input lead 20 is connected to the output lead 27 by, on the one hand, the contacts II.7 and III.7 in parallel and, on the other hand, by an analogue inverter 33 in series with the contact IV.7. The input lead 21 is connected to the output lead 28 by, on the one hand, the contact III.8 and, on the other hand, by the analogue inverter 34 in series with the contact IV.8. Finally, the input lead 22 is connected to the output lead 29 by the contact IV.9.

It should be understood that in the rest state the contacts of electronic switch 12 are normally open and that a signal applied to the control input I will close all the contacts I.3 to I.6, a signal applied to the control input II will close all the contacts II.4 to II.7, etc. The analogue adder 13 summs the signals applied to its inputs 23 to 29.

If the distance between the transducer 2 and the transducer 3 is equal to d, the sample i1 projected by transducer 2, at the instant O, will be found at the transducer 6 at the instant, (d/v)+3T. At this instant the sample i2 projected by transducer 2 with a delay T onto i1 will be found at the transducer 5, the sample i3 projected with a delay 2T will be found at the transducer 4, and the sample i4 projected with a delay 3T will be found at the transducer 3. The instant (d/v)+3T corresponds to that point in time at which the output I of sequencer 14 is activated which, by means of the contacts I.3 to I.6, connects the leads 16 to 19 to the leads 23 to 26. These connections transmit to the adder 13 the signals detected respectively by the transducers 3 to 6, that is to say signals proportional to i1, i2, i3 and i4. With the exception of the coefficient of proportionality, the adder 13 then summs these signals so as to deliver the transformed term I1, according to equation (2)

$$I1=i1+i2+i3+i4 \quad (2)$$

At the instant (d/v)+4T, the samples i1 to i4 which continue to be propagated along the track 10 are found respectively at the transducers 7 to 4. At this instant the output II of sequencer 14 is activated, the contact II.7 transmits a signal proportional to i1 to the input 27; the contact II.6 transmits a signal proportional to i2, but with the sign reversed by the inverter 32, to the input 26; the contact II.5 transmits a signal proportional to i3 to the inlet 25; and the contact II.4 transmits a signal proportional to i4 to the input 24. The result is that, except for the coefficient of proportionality, the adder 13 summates these signals so as to deliver the transformed term I2, according to equation (3)

$$I2=i1-i2+i3-i4 \quad (3)$$

In the same way, at the instant d/v+5T, it is found that the adder 13 delivers the term 13, according to equation (4)

$$I3=i1+i2-i3-i4 \quad (4)$$

and at the instant (d/v)+6T, it delivers the term I4, according to equation (5)

$$i4=i1-i2-i3+i4 \quad (5)$$

The equations (2) to (5) correspond closely to the matrix multiplication of equation (1), above. In order to illustrate the calculation, a table TA1 is shown below the circuits of FIG. 1, which shows the signs of a Hadamard matrix with 4 lines and 4 columns. A table TB1 indicates, under the output transducers 3 to 9, the signs applied successively by the electronic switching arrangement 12, the correspondence between the table TA1 and the table TB1 being clear.

In the embodiment that has just been described, it appears that by using a single track with multiple tapping, it is possible by combining the output signals from these tappings to obtain a Hadamard transform of the input signals.

Before describing variants of the transformer of FIG. 1, it should be noted that the latter can be used to carry out a Hadamard transformation of two-point groups by using only the transducers 3 to 5 and a control circuit having two outputs I and II. A Hadamard transformation of eight-point or higher point groups may also be carried out by using a larger number of output transducers on the track 10, this number being equal to 8+(8−1)=15. However, it is known that the Hadamard transformation of $2^p$ points may be carried out by several stages in series, each stage being simpler, like the quick Hadamard transformation, and an example will be given hereinafter.

It should also be noted that the distance d between the input transducer 2 and the output transducer 3 is preferably equal to a whole number of times, greater than one half, the distance between the output transducers 3 to 9. Thus, the samples i1 to i4 are at transducers 3 to 9 at the moment when the input transducer 2 is not emitting a sample. Perturbation effects caused by direct Hertzian radiation between the transducer 2 and the output transducers 3 to 9 is thus avoided.

FIG. 2 shows, on the left, an output transducer similar to an actual transducer, although a real transducer may contain more than two electrodes. Its first electrode 35 connected to ground, while the second electrode 36 is connected to an output signal terminal. The elastic waves are propagated in the direction of the arrow F and reach electrode 35 before electrode 36. On the right, an output transducer is illustrated diagrammatically by a rectangle with an arrow F also indicating the direction of propagation of the waves, and in which is inscribed R+. The "R+" indicates that it is a receiver transducer whose output signal is by convention positive. FIG. 3 shows, on the left, an output transducer with its first electrode 37 connected to an output terminal, while the second electrode 38 is grounded, the elastic waves being propagated in the direction of the arrow F annd reaching electrode 37 before electrode 38. On the right, an output transducer is illustrated diagrammatically by a rectangle with an arrow F also indicating the direction of propagation of the waves. The inscribed R−indicates that it is a receiver transducer whose output signal is by convention negative.

On examining FIGS. 2 and 3 and bearing in mind the fact that the centres of the fingers or electrodes of each transducer are displaced by an amount equal to half a wavelength of the acoustic signal, it can be seen that a negative output signal and a positive signal differ simply by their phase opposition as regards the propagated carrier wave of the analogue signal, that is to say of the sample. This fact also enables one to understand that, in order to change the sign of a signal at the output of a transducer, it is sufficient to reverse the connections of these even and odd electrodes to ground on the one hand, and to the output terminal on the other hand. This is why in practice analogue inverters such as 30 to 34, FIG. 1, may be used. If there is any risk of causing phase shifts, electronic switching arrangements for the electrodes of the transducers in question should be used, such as the electronic contacts of switching arrangement 12. It is thus easier to maintain, between the respective output electrodes of the transducers, equal connection lengths that will enable the phases of the output signals at the inputs of the adder circuit 13 to be maintained.

FIGS. 4 and 5 are similar to FIGS. 2 and 3, but relate to emitter transducers, which is why the arrows F start at the edges of the rectangles. FIG. 4 shows, on the left, an emitter transducer which is illustrated diagrammatically on the right by a rectangle in which is inscribed E+, which denotes that the waves projected by this transducer, in the direction of the arrow F, and received by a transducer labelled R+ will give a positive signal at the output of the latter transducer. Since it is known that in practice an emitter transducer emits waves symmetrically, a transducer of FIG. 2, placed to the left of the emitter of FIG. 4, will deliver a negative signal.

Figure 6:
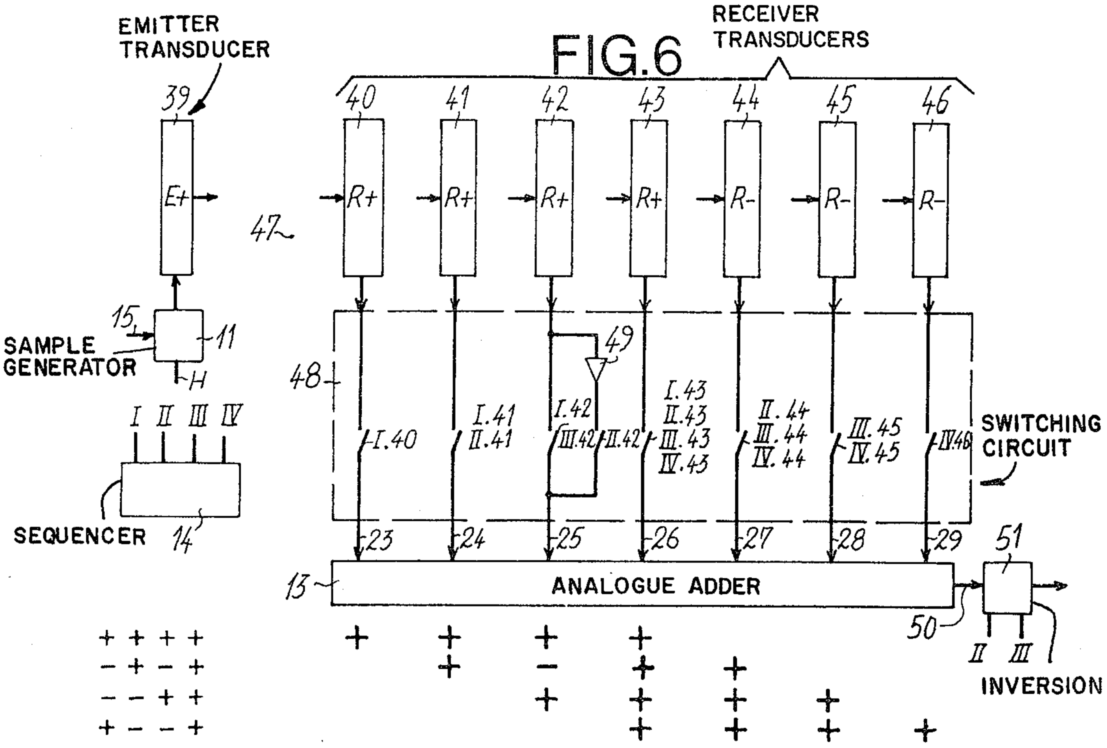
FIG. 6 illustrates a variant of the transformer of FIG. 1, in which are used the terminology and conventions already defined in FIGS. 2 to 5. It will also be seen that an analogue sign inverter also appears, although, as has been mentioned above, it is possible to switch the connections of the electrodes of the receiver transducer associated with this inverter.

The transformer of FIG. 6 comprises, on a substrate capable of propagating acoustic waves, an emitter transducer 39 and seven receiver transducers 40 to 46, which are all arranged on the rack 47 to receive the waves projected by the emitter transducer 39. The transducers 40 to 43 and 46 are of the R+ type, while the transducers 44 and 45 are of the R− type. The input f the E+ type transducer 39 is connected to the output of sample generator 11. The outputs of the transducers 40 to 46 are connected to an arrangement of electronic contacts 48 whose outputs are connected to an adder 13. The arrangement 48 is, as in FIG. 1, controlled by a control circuit 14. In switcher 48, transducer 40 is connected to the input 23 of the adder 13 by the contact I.40; transducer 41 is connected to the input 24 by the contacts I.41 and II.41 in parallel; transducer 42 is connected to the input 25 on the one hand by the contacts I.42 and III.42 in parallel and, on the other hand, by an analogue inverter 49 in series with a contact II.42; transducer 43 is connected to the input 26 by the contacts I.43, II.43, III.43 and IV.43 in parallel; transducer 44 is connected to the iput 27 of adder 13 by the contacts II.44, III.44 and IV.44 in parallel; transducer 45 is connected to the input 28 by the contacts III.45 and IV.45 in parallel; and finally transducer 46 is connected to the input 29 by the contact IV.46.

Figure 1:
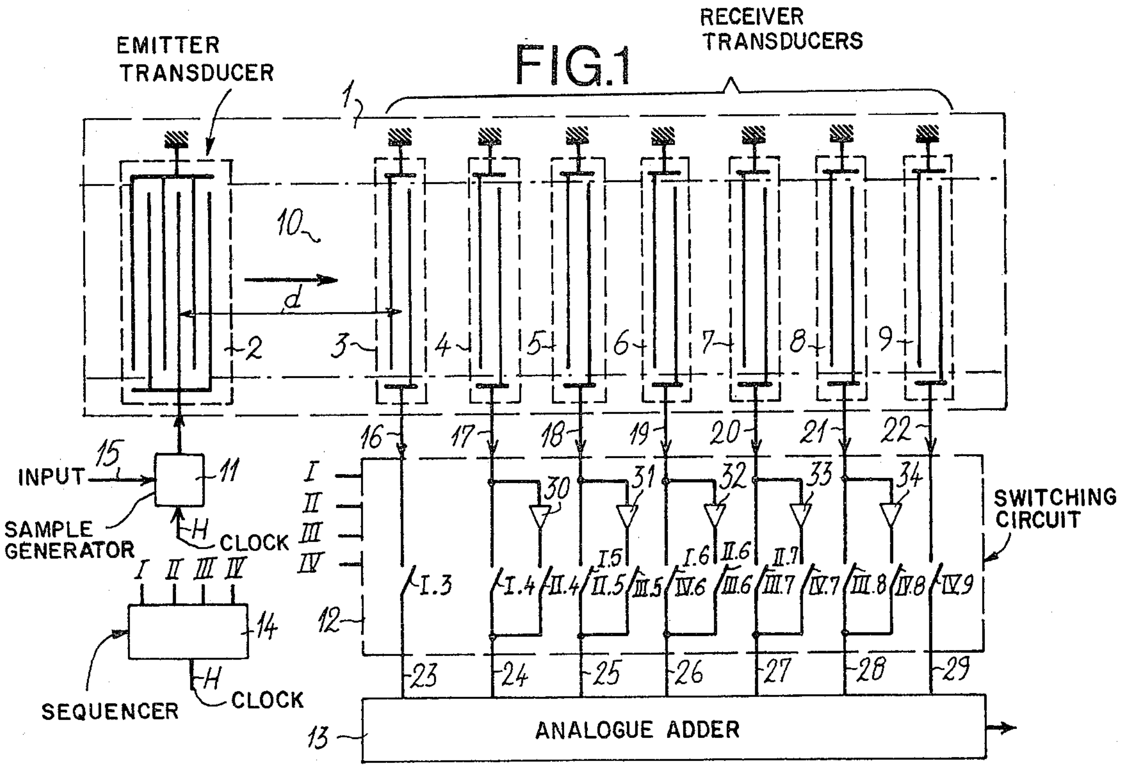
Figure 2:
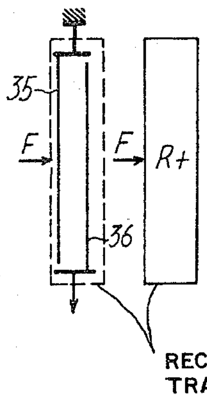

It is assumed that the samples i1 to i4 are projected by the emitter transducer 39 under the same conditions as the samples were projected by emitter transducer 2 in FIG. 1. At time I there is obtained at the output terminal 50 of adder 13, the transformed term J1 according to the following equation (6):

$$J1 = i1 + i2 + i3 + i4 \tag{6}$$

Figure 3:
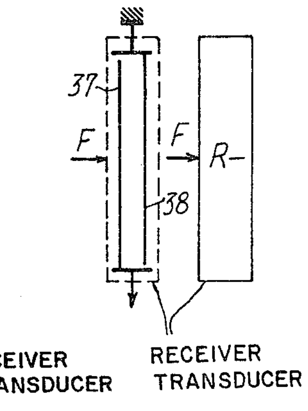
Figure 4:
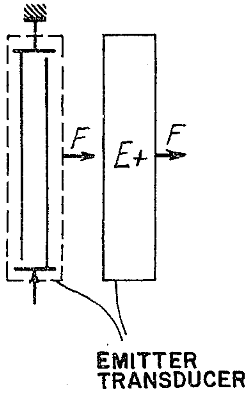
Figure 5:
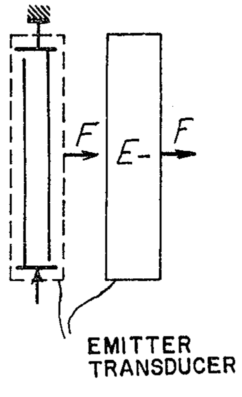
FIG. 5 shows, on the left, an emitter transducer which is diagrammatically illustrated on the right by a rectangle in which is inscribed E−, which denotes that the waves projected by this transducer in the direction of the arrow F and received by a receiver R+ placed in front of the arrow will deliver a negative signal.

At time I+T=II, the transformed term J2 is at output 50, according to the following equation (7):

$$J2 = -i1 + i2 - i3 + i4 \tag{7}$$

the sign (−) before i3 being obtained by the inverter 49 and the contact II.42. The sign (−) before i1 is obtained by reversing the odd and even electrodes of the transducer 44, indicated by R−, according to the convention of FIG. 3.

It can be shown that the transformed terms J3 and J4 are given by the following equations (8) and (9):

$$J3 = -i1 - i2 + i3 + i4 \tag{8}$$

$$J4 = i1 - i2 - i3 + i4 \quad (9)$$

It can be seen that, compared with the terms transformed by the transformer of FIG. 1, $$J1 = I1; J2 = -I2; J3 = -I3; \text{ and } J4 = I4 \quad (10)$$

Below the circuits shown in FIG. 6 there is illustrated, on the left, the square matrix of the transformation, which differs from that of FIG. 1 by a simple inversion of the lines. In order to obtain the true Hadamard transform at the output of the transformer of FIG. 6, the output 50 of adder 13 is connected to an inversion circuit 51 that can be controlled to deliver the analogue inverse of its input signal at the times II and III. A table to the right of the square matrix illustrates the functioning of the contacts of switching circuit 48. It can be seen that the circuit 48 of FIG. 6 is much simpler than the circuit 12 of FIG. 1.

Figure 7:
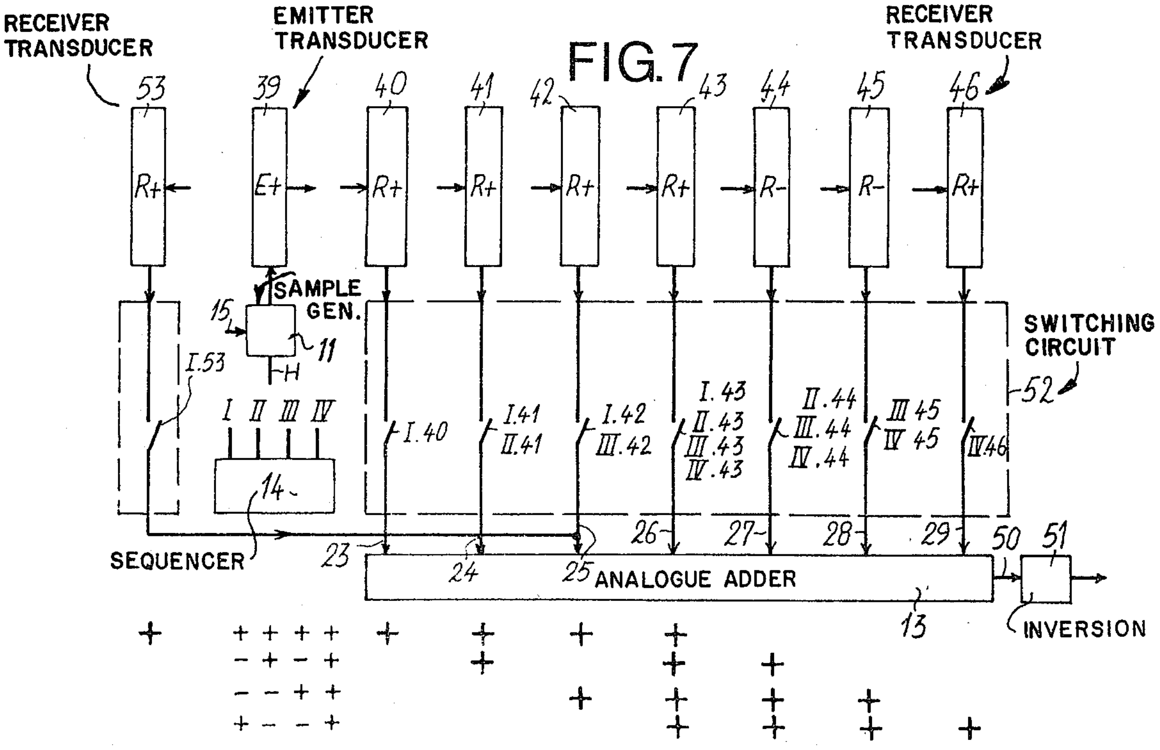

FIG. 7 shows a variant of the transformer of FIG. 6, which comprises the transducers 39 to 46, a switching circuit contact arrangement 52, an adder 13, a sampling circuit 11, a control circuit 14, and in addition an eighth receiver transducer 53 of the type R+. Transducer 53 is symmetrical with the transducer 42 as regards the emitter transducer 39, and receives the back radiation waves of emitter transducer 39, but with a reversed phase. The results is that the transducer 53 delivers a negative signal while the transducer 42 delivers a positive signal. The electrode (not grounded) of receiver transducer 53 is connected to the input 25 via a contact II.53. In contrast, the transducer 42 is connected to the input 25 only by the contacts I.42 and III.42. It can be shown that the output 50 of the adder 13 delivers transformed terms equal to J1, J2, J3 and J4, like the transformer of FIG. 6. The square matrix and the table illustrating the operation of the contacts is also shown below the circuits of FIG. 7. In the term J2, the sign (−) in front of i3—(see equation (7)) is obtained, not by an inverter such as 49, or an equivalent switching of the electrode connections, but by adding the transducer 53. By virtue of this fact, the logic circuits processing the signals from the elastic wave device are thus simpler.

It should be noted that, in the transformers of FIGS. 1, 6 and 7, instead of providing a plurality of electronic contacts in parallel in a circuit loop, the outputs I–IV are combined with the aid of simple logic combination circuits known to those skilled in the art. Thus, only one electronic contact is closed at one or several of the times I–IV. By way of example, the outputs I–IV may be connected to control only a single contact, which will replace the contacts I.43, II.43, III.43 and IV.43.

It should also be noted that the transformers of FIGS. 1, 6 and 7 are capable of treating successions of groups of four samples without interruption since, at the instant when the fourth transformed term of a group is calculated, namely at time IV, the first three samples of the following group are under the first three output transducers. At the following time I, the calculation of the first transformed term of the following group is supplied.

Figure 8:
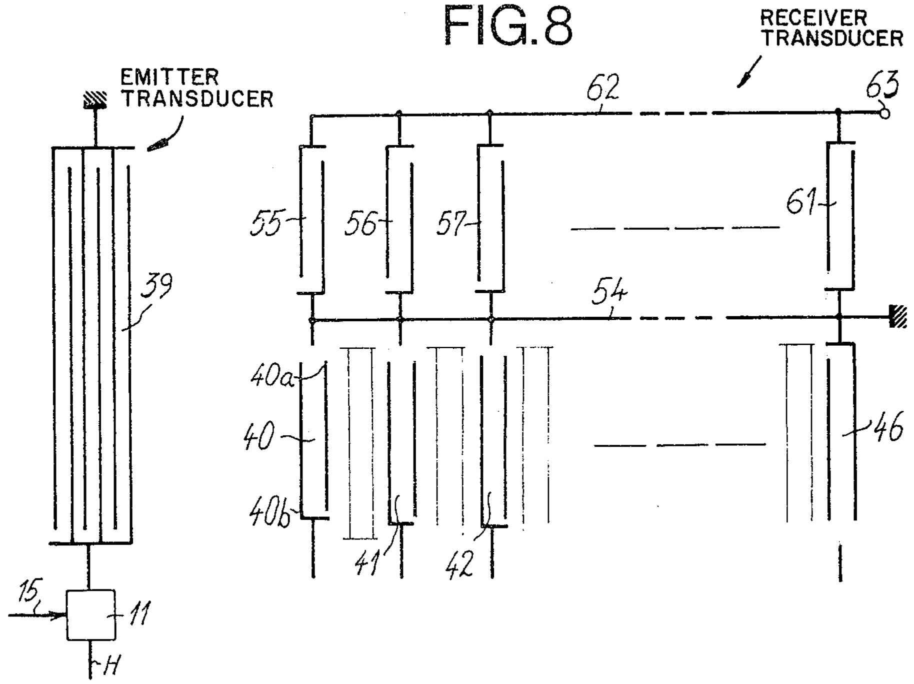

FIG. 8 shows by way of example a diagrammatic view of an elastic surface wave device 1 containing the transducer combs 39 to 46 of FIG. 6, but in accordance with a practical embodiment. Between the output or receiver transducer combs 40 to 46, whose fingers are split fingers, as recommended in the art, there are equidistant dummy fingers having the same mutual inter-spacing of half a wave length, as exists between the fingers of the combs, in order to reduce the reflections of the elastic waves on the combs. The fingers are called dummy fingers when their ends are not connected to outside electrodes, but are simply connected to one another. The mutual distance between the branches of the split fingers is λ/4, and their thickness is λ/8, for the split fingers and combs.

Above the conductor 54, connecting the grounding electrodes of the combs 40 to 46 to ground, there is an additional network of combs 55 to 61. Each of the combs has a grounding electrode, that is connected at 54, while the other electrode is connected by means of a common lead 62 to a reference output 63. This additional network, which also comprises split fingers between the combs, enables a signal to be delivered to the output 63, whose significance will be seen later. This signal has a constant amplitude and the frequency of the carrier wave carrying the samples. It will be noted that the emission comb 39 has a length which is sufficient so that the waves that they project reach the combs of the output or receiver transducers 40 to 46 and those of the additional network 55 to 61 at the same time.

It can also be seen from FIG. 8 that the space between the electrodes 40*a* and 40*b* of the comb 40 is less than the space between the electrodes 41*a* and 41*b*, the latter width in turn being less than that between the electrodes 42*a* and 42*b* of the comb 42, and so on. In other words, the length of the successive combs 40 to 46 constantly increases. This arrangement was chosen so as to take into account propagation losses in the elastic waves from comb 40 to comb 46, and to compensate such losses. In practice, all the length of the combs are determined experimentally. In this way the signal relating to a sample has the same amplitude irrespective of whether, during the passage of the sample under the combs, it is delivered by one comb or by another. It is possible to provide this compensation while preserving combs of constant length and while attaching variable and regulable attenuators to the leads connected to the electrodes 40*b* to 46*b*. These attenuators may be produced, in accordance with a known technique, in the form of thick layer resistors obtained by serigraphy on the substrate 1. Preferably, as in the example described and shown in FIG. 8, the combs 40 to 46 are symmetrical with respect to the centre of the track by which they receive the elastic waves.

It will be understood that for the example of FIG. 7, the practical arrangement illustrated with regard to the description of FIG. 8 may also be obtained. To do this, FIG. 8 is given an additional comb network adjacent to the combs 40 to 46. This additional FIG. 8 comb is in the same relative position as the comb 53 (FIG. 7) and has the same length as the comb 42. By providing a comb immediately "upstream" of 53, having regard to the waves coming from emitter 39, there will be the same number of fingers as those preceding the comb 42. If attenuators are used in place of combs of variable length, the output of transducer 53 must also be supplied with them.

Figure 9:
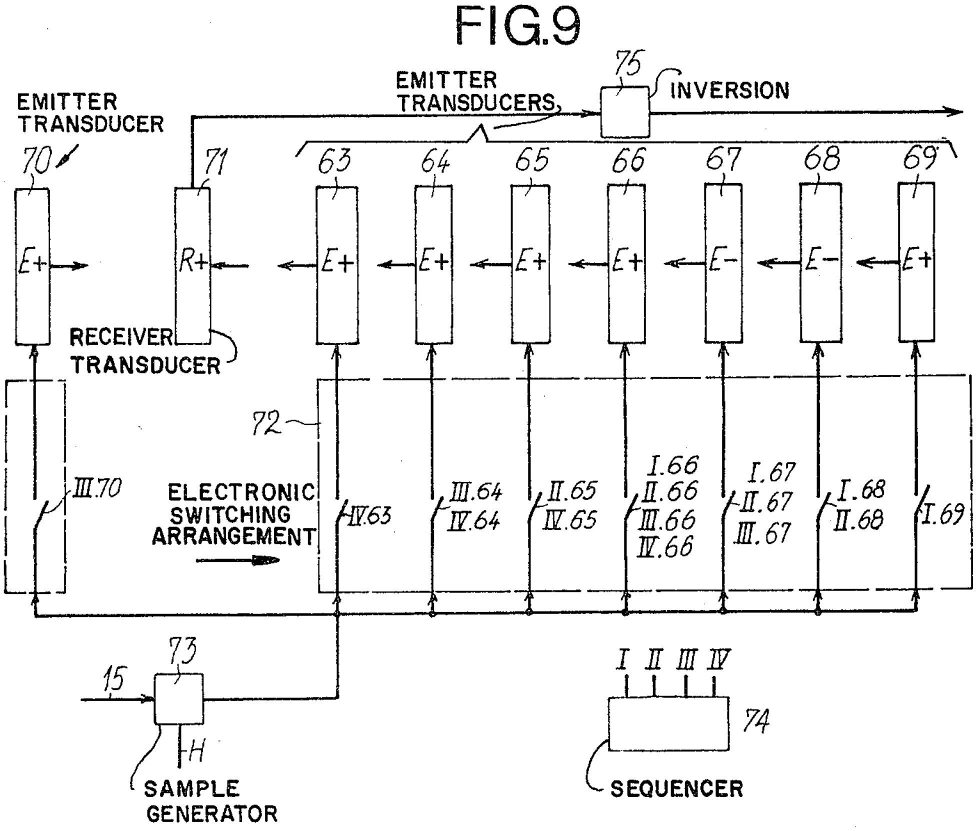

FIg. 9 shows a transformer according to the invention, which structurally resembles that of FIG. 6. However, the roles of the receiver transducers and emitter transducer have been reversed. In actual fact, the transformer of FIG. 9 comprises, in place of the receiver transducers 40 to 46 and 53, emitter transducers 63 to 69 and 70, and, in place of the emitter transducer 39, a single receiver transducer 71. The transducers 63 to 70 are fed, via an electronic contact arrangement 72 having a role similar to the role of switching circuit 52 (FIG. 7), from a sample generator 73, which is identical to generator 11. The contacts of switching arrangement 72 are controlled by a control circuit 74 which is identical to sequencer 14, which delivers the time signals I, II, III and IV. The emitter transducers 63 to 66 and 69, as well as 70, are, with the conventions adopted hereinbefore, E+ transducers, while the transducers 67 and 68 are E− transducers. The receiver transducer 71 is type R+ for example. The output electrode of the emitter transducer 71 is connected to the input of the circuit inversion 75, which is identical to inversion circuit 51, which delivers the true Hadamard transform. The emitter transducers 65 and 70 are positioned symmetrically on the substrate with respect to receiver transducer 71.

The arrangement 72 comprises, starting from the generator 73, at the input of emitter transducer 69 a contact I.69; at the input of transducer 68, the contact I.68 and II.68 in parallel; at the input of transducer 67, the contacts I.67, II.67 and III.67 in parallel; at the input of transducer 66, the contacts I.66, II.66, III.66, and IV.66; at the input of transducer 65, the contacts II.65 and IV.65; at the input of transducer 64, the contacts III.64 and IV.64; at the input of transducer 63, the contact IV.63; and at the input of transducer 70 the contact III.70.

At time I, by means of the contacts I.66 to I.69, the sample i1 delivered by generator 73 is applied to the emitter transducers 66 to 69 which transmit to the receiver transducers 71 the signals i1, −i1, −i1 and i1. At time II, by means of the contacts II.65 to II.68, the sample i2 delivered by generator 73 is appled to the emitter transducers 65 to 68, which transmit respectively to the receiver transducer 71 the signals i1+i2, −i1+i2, −i1−i2, and i1−i2. at time III, by means of the contacts III.64, III.70, III.66 and III.67, the sample i3 is applied to the emitter transducers 64, 70, 66 and 67, which transmit respectively to receiver transducers 71 the signals i1+i2+i3, −i3 (seen in the direction of propagation), −i1−i1+i3, and i1−i2+i3, while the transducer 65 emits the signal −i1+i2. At time IV, by means of the contacts IV.63 to IV.66, the sample i4 is applied to the emitter transducers 63 to 66, which transmit the following signals:

$$i1+i2+i3+i4=J1$$

$$-i1+i2+i4=J2+i3$$

$$-i1-i2+i3+i4=J3$$

$$i1-i2-i3+i4=J4$$

When these signals are picked up by the receiver transducer 71, the latter transmits in succession J1, J2, J3 and J4 to 75, since at the same time as J2+i3 it receives from emitter transducer 70 the signal −i3. The signals I1, I2, I3 and I4 are found at the output of the inversion circuit 75. It should be noted that the inversion signals applied to the circuit 75 are retarded by a certai amount with respect to the signals II and III from sequencer 74 in order to take into account the propagation time of the signals between transducers 64 and 71.

The transformer of FIG. 9 has the advantage, compared with that of FIG. 7, since it requires only a single amplifier at the output of the transducer 71, whereas it is necessary to provide one amplifier per output transducer in the case of FIG. 7. It is found in practice that the signals at the output of all of the output transducers must be amplified to obtain a signal level capable of being processed further. Thus, in the transformer of FIG. 9, the number of amplifiers is reduced substantially and, furthermore, it is no longer necessary to provide control means ensuring that the output amplifiers of the transducers of FIG. 7 have equal gains and produce equal phase displacements in the signals, since these phase displacements have to be added in an analogue manner.

It is clear that the comments made concerning the transformers of FIGS. 6 and 7 remain valid for the transformer of FIG. 9. The number of electronic contacts of switching arrangement 72 may be reduced by using a logic circuit, successions of groups of four samples may be treated, and the elastic wave device may be implemented in a form practically identical to that of FIg. 8. The only differrence in FIG. 9 is that an additional emission transducer is added to the right of the transducers 55 to 61 in order to excite the latter.

In the case of a T.V. picture to be transformed in accordance with the Hadamard transformation, there are clearly more than four points or four samples to be transformed per picture. In this case the property of the Hadamard matrix is utilised, namely the ability to be decomposed into a tensorial product whose number of factors depends, in a manner known per se, on the number of points being transformed. In general, this number of points is equal to a power of 2, which produces with transformation matrices of the order 2 a number of factors equal to the exponent, or in the case of matrices of order 4 a number of factors equal to half the exponent. It will be shown hereinafter how the transformers of the invention can be used to carry out the Hadamard transformation in several stages. So as not to complicate the description unnecessarily, we shall restrict the description to a two-stage transformation in which transformers similar to those in FIG. 7 are used.

Figure 10A:
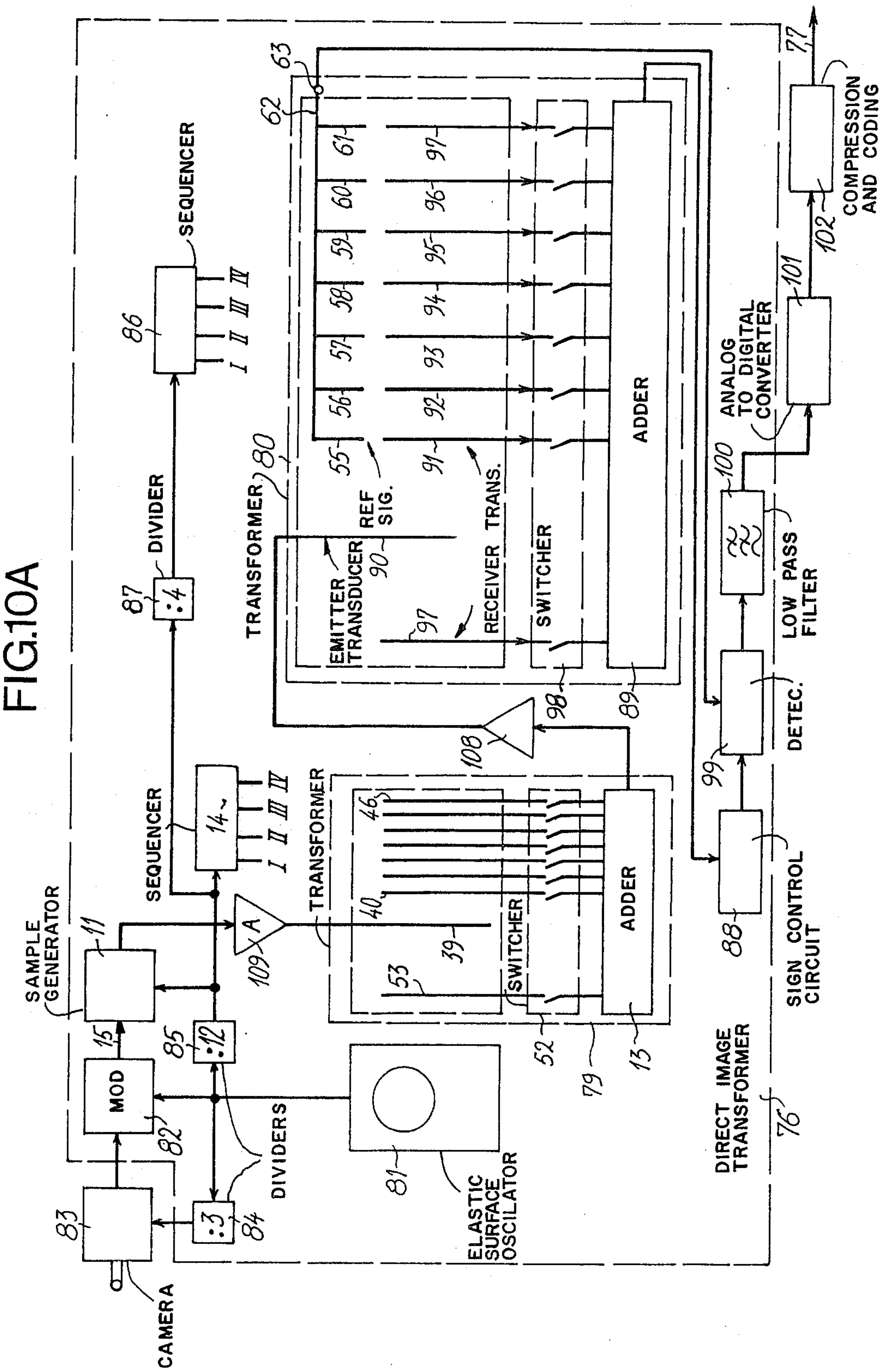
Figure 10B:
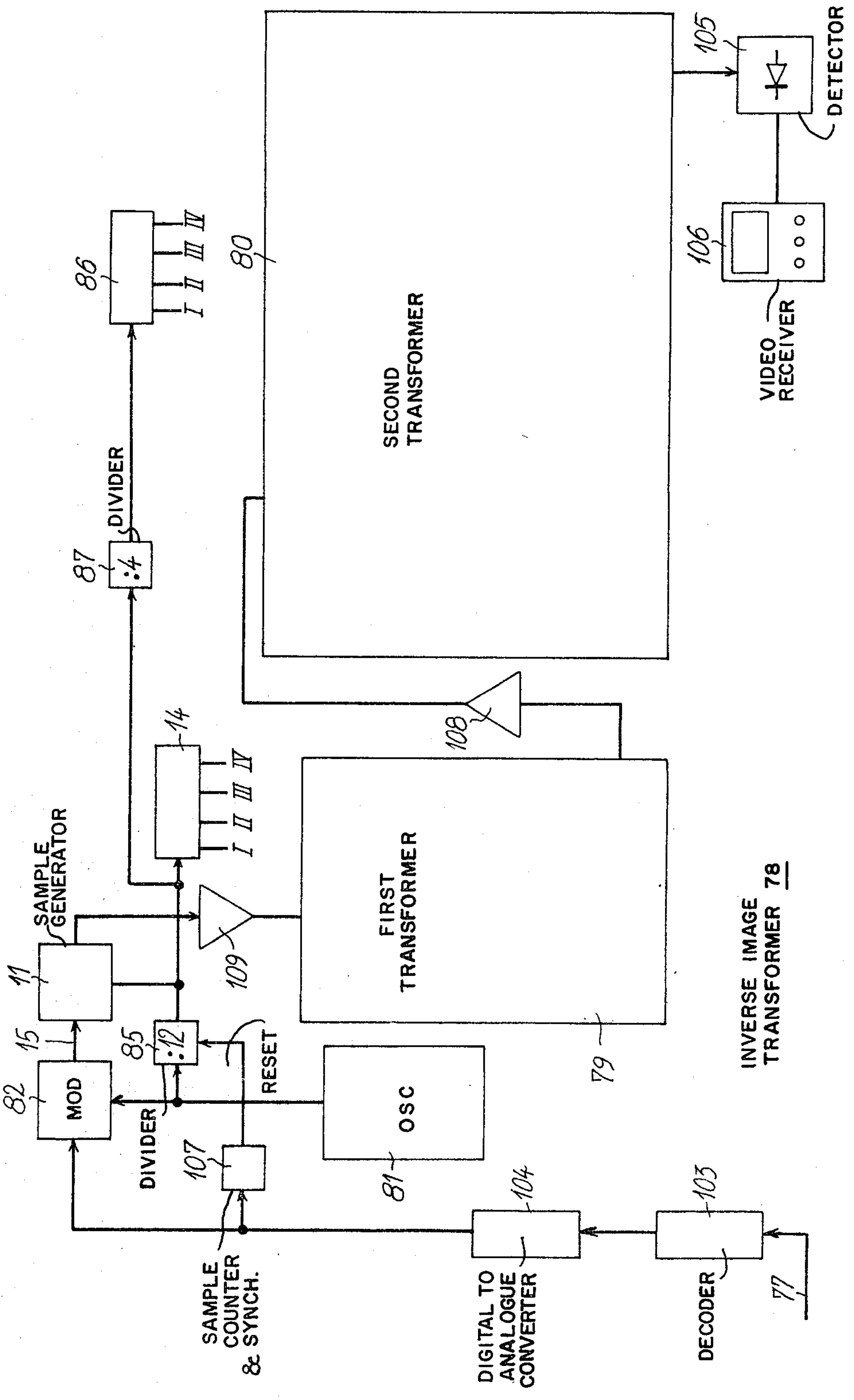

FIG. 10 is a block diagram formed by placing FIG. 10B to the right of FIG. 10A. A direction image transformer 76 is connected by a transmission line 77 to an inverse transformer 78 which restores the initial image.

The transformer 76 is a two-stage transformer comprising two transformers 79 and 80 connected in series, an elastic surface oscillator 81 and a modulator 82. The oscillator 81 serves at one and the same time to synchronise the operation of the camera 83 which delivers to the transformer 76 the image signals being transformed, and to guide the operation of the transformer.

Assuming that the camera 83 is a visiophone, a synchronisation frequency $F_p$=8.192 must be provided. This frequency may be obtained from the frequency of the oscillator 81 by dividing it in box 84 by a whole number such as 3, resulting in a frequency of 24.576 MHz for the oscillator 81. This frequency may easily be obtained by using an elastic surface wave oscillator, such as for example those described in the technical article entitled "Oscillateurs à ondes élastiques de surface" by Jeannine Hénaff in the review "L'onde électrique" 1976, vol. 56, No. 4, pages 189–196.

The output signal from the oscillator 81 is applied to the divider 84, where the frequency is divided by 3 before being fed to the camera 83. Moreover, the output signal from the oscillator 81 is fed to an input of the modulator 82, whose second input receives the video signal supplied by the camera 83 and whose output 15 is connected to the signal input of the sample generator 11 of the transformer 79. The control signal applied to the control input of generator 11 is obtained from the output signal from the oscillator 81 via the frequency divider 85, whose division factor is equal to 12, thus resulting in a sampling frequency close to 2 MHz, which satisfies the sampling theory. The output signal from the divider 85 is also applied to the control circuit 14.

In the transformer 79, the distance between the receiver transducers corresponds to the sampling frequency of the video signal of the camera 83.

The transformation that is effected in the transformer 80 is such that, if one considers four successive groups of transformed terms J1 to J4 delivered by the transformer 79 and if these terms are called J11, J21, J31, and J41 for the first group, J12, J22, J32 and J42 for the second group, J13, J23, J33 and J43 for the third group, and finally, J14, J24, J34, and J44 for the fourth group. The transformer 80 delivers the transformed terms of the four samples J11, J12, J13 and J14, the transformed terms of the four samples J21, J22, J23 and J24, the transformed terms of the 4 samples J31, J32, J33 and J34, and finally, the transformed terms of the four samples J41, J42, J43 and J44.

Consequently, in the transformer 80, the distance separating the output or receiver transducers 91-97 is equal to four times the distance between the output transducers 40-46 of the transformer 79. Moreover, the control circuit 86 of transformer 80 receives its control signals from a divider 87, which divides by four the sampling frequency applied to the control circuit 14 of transformer 79.

Thus, during the time I of the control circuit 86, the following four terms are obtained in succession:

K11=J11+J21+J31+J41

K21=J12+J22+J32+J42

K31=J13+J23+J33+J43

K41=J14+J24+J34+J44

Then, at time II of the control circuit 86, the following four terms are obtained in succession:

K12=−J11+J21−J31+J41

K22=−J12+J22−J32+J42

K32=−J13+J23−J33+J43

K42=−J14+J24−J34+J44

At time III, the following four terms are obtained in succession:

K13=−J11−J21+J31+J41

K23=−J12−J22+J32+J42

K33=−J13−J23+J33+J43

K43=−J14−J24+J34+J44

At time IV, the following four terms are obtained in succession:

K14=J11−J21−J31+J41

K24=J12−J22−J32+J42

K34=J13−J23−J33+J43

K44=J14−J24−J34+J44

In FIG. 10A, it can be seen that in the transformer 79 the inversion circuit 51 (FIGS. 6, 7) has been omitted, enabling the signs of the terms J12, J22, J32 and J42, and of the terms J13, J23, J33 and J43 to be changed, in accordance with equation (10). In actual fact, according to the rules of multiplication of matrices and as will be seen from the above equations, these terms are grouped so as to coincide with the final terms K21, K31, K22, K32, K23, K33, K24 and K34. Thus, it is sufficient to provide adequate sign changes in the sign control circuit 88, whose input is connected to the output of the adder 89 corresponding to adder 13, FIG. 6. In FIG. 10A the emitter transducer is symbolised by a line 90 and the receiver transducers by the lines 91 to 97, and the switching arrangement of the contacts is shown at 98. The sign control circuit 88 changes the signs of K21, K31, K12, K42, K13, K43, K24 and K34, and thus supplies the true Hadamard transform.

The output signal from the circuit 88 is applied to an input of a demodulator or synchronous detector 99 whose second input is connected to the output 63 of the transformer 80. Transformer 80 delivers, as has been described in connection with FIG. 8, a reference signal regarding the phase of the carrier wave used on the elastic surface wave substrate. Thus, the output of the demodulator or detector 99 enables transformed sample signals to be delivered in the video band. The output of detector 99 is connected to the input of a low-pass filter 100 whose output is connected to the input of an analogue to digital converter 101 which delivers the numerical values of the transformed terms. It will be seen that it is important to have available a reference signal in order to demodulate the transformed terms at the output of sign control 88, since an error in the phase will result in a deformation of all the transformed terms. The combs 55 to 61, FIG. 8, enable this reference signal to be obtained since they are subjected to the same thermal constraints as the combs of the emitter and receiver transducers. In particular, the deviation between their fingers varies in the same way as that of the transducers processing the samples.

It should also be noted that it is possible to suppress the sign change circuit 88 between the adder 89 and the synchronous detector by postponing the sign change operation so that the latter is effected only after having obtained the numerical values of the transformed terms at the output of the converter 101. In numerical terms, a change of sign is, in effect, a very easy operation to carry out.

The output of the converter 101 is connected to the input of a compression and coding circuit 102, which effects the compression and coding, such as described in the article in the French Journal "Annales des Télécommunications", previously mentioned and, in particular, in FIG. 1 of the article. This compression and coding enables the data to be transmitted via the transmission channel 77, connected to the output of compression-coder 102, to be reduced.

The other end of channel 77 (FIG. 10B) is connected to the input of a decoding circuit 103, which carries out the reverse operation to that carried out in circuit 102. The output of decoder 103 is connected to the input of a digital to analogue converter 104 which transforms the numerical samples provided by decoder 103 into a video analogue signal which is processed by the inverse transformer 78, just as the video signal from the camera 83 is processed by the direct transformer 76.

To this end, the transformer 78 comprises, like transformer 76, an oscillator 81, a modulator 82, a sample generator circuit 11, a frequency divider 85, a first transformer 79, and a second transformer 80. The output of the adder of (not shown in FIG. 10B) of the transformer 80 is connected to a simple diode detector 105 which delivers the video signal (that is then applied) to a cathode tube receiver 106 on whose screen will appear the image seen by the camera 83, and is then transmitted by the system that has just been described. It should be noted that the simple diode detector 105 may be used in place of the synchronous demodulator or detector 99 (FIG. 10A), since the video signal to be applied to receiver 106 (FIG. 10B) can only be positive.

It should of course be understood that the frequency divider 85 is synchronized with the divider 85 of the direct transformer in order that the samples are transformed in groups of four synchronous with those that are delivered by the direct transformer. It is thus necessary on the one hand to apply to the sample generator circuit 11 of inverse transformer 78, control signals at the moment when a sample carried by the carrier is applied to the signal input of generator 11 and, on the other hand, to synchronize the groups of four or sixteen samples, for example, with respect to the start of each line of the T.V. image provided by the camera 83. That is why a logic circuit 107 which counts the samples received and detects the line synchronization signals so as to reset to zero the divider 85 of inverse transformer 78 at predetermined points in time so as to ensure synchronization, is connected to the output of the converter 104. The circuit 107 has a known structure of the type used in multiplex transmission systems.

Signal amplifiers such as 108 and 109 are provided between the different stages of the direct and inverse transformers, as well as at their inputs.

It should be noted that the oscillators 81, which are preferably elastic surface wave oscillators, then have their substrate coupled thermically to the substrate of the associated transformer, which enables a compensation for any derivatives due to variations in temperature. It should also be noted that the oscillators of the direct and inverse transformers are manufactured by use of the same mask, with the result that the synchronization obtained by counter 107 may easily be maintained.

It should be understood that the direct and inverse transformers which have just been described could each comprise more than two stages. One may pass from the second stage to a third stage in a manner similar to the passage from the first stage to the second stage, which has been described above. Then, one may pass from the third stage to a fourth stage, etc. It should be noted that in the higher order stages, the transducers are spaced further and further apart. However, the distance between the fingers of the combs of these transducers remains constant, as does the distance between any possible dummy fingers that fill the gaps between the combs.

I claim:

1. A signal transformation system driven by periodic sample signals which deliver an output series of signals in transformed terms, said system comprising transformer means including an elastic surface wave substrate having at least one transducer means of a first type and at least one transducer means of a second type mounted thereon to transmit signals via a single track on said elastic surface wave device, signal generator means for causing one type of said transducer means to transmit periodic samples of the signal to be transformed over said single track, the other type of said transducer means being arranged to receive signals from said transmitted sample signals, the various transducer means being positioned at equal distances behind one another along said track, said equal distance being equal to the path on said track traversed by the sample during a single period in the output of said signal generator means, algebraic adder means for providing the first transformed term by adding output signals from the other type transducer means, switching means interposed between said transformer means and said adder means for combining signals in any of many predetermined orders to create predetermined transformed output signals, the switching means selectively connecting the other type transducer means to said adder means with the algebraic signs of the additions being determined according to the coefficients of a Hadamard matrix.

2. The system of claim 1 wherein there are N samples to transform and N-1 of said other type of transducer means, and means whereby, once the Nth sample has reached the first of said other type of transducer means, said adder means provides a second term in the transformed output by adding the output signals of the transducer means 2 to N+1 at the time when the Nth sample reaches the other type transducer means 2, and so on, the Nth transformed term being obtained by adding the output signals from the second type transducers N to 2N−1, and means responsive to said adder means for delivering the N transformed terms in series.

3. The transformation system of claim 2 wherein the one type of transducer means is an emitter transducer and the other type of transducer means is a receiver transducer means, said N−1 transducer means being receiver transducer means, means for delivering the periodic output of said signal generator means to the input of said emitter transducer, and means for delivering the output signals of said N−1 receiver transducer means through said switching means to the input of said adder means, said switching means distributing said receiver output signals in a predetermined pattern obeying the order of the Hadamard matrix.

4. The transformation system according to claim 1 wherein the one type of transducer means is a receiver transducer means, and the other type of transducer means is an emitter transducer means, there being a plurality of said emitter transducers, means responsive to the operation of said switching means for distributing said periodic signals from said signal generator to the inputs of the emitter transducers which are connected thereto, said distribution providing the coefficients in the Nth order Hadamard matrix, and the powers of the N samples that are applied thereto, and means responsive to the receiver transducer for delivering the N transformed terms.

5. The transformation system according to claim 1 wherein the other type of said transducer means are comb electrode receiver transducers, at least some of which have reversed connections to their comb electrodes in order to deliver signals of opposite algebraic signs as compared with signals which are delivered by at least some other receiver transducers having non-reversed comb electrode connections, whereby the algebraic operations are reduced and purely arithmetic operations are increased, and means for selectively controlling the sign of a signal for inverting the sign of certain transformed terms in order to obtain the true Hadamard transform.

6. The transformation according to claim 5 and said first type of transducer means is an emitter transducer, at least one of said receiver transducer means being mounted on said substrates in a position which is symmetrical to the position of another receiver transducer means which is mounted on the opposite side of said emitter transducer, said symmetrically mounted receiver transducers delivering signals having different arithemetical signs responsive to front and back waves from said emitter transducer, the outputs of the symmetrical transducers being connected to the same inlet of the adder via said switching means depending on the sign of the matrix of the Hadamard transformation concerning the sample delivered by the symmetrical transducers.

7. The transformation system according to claim 1 wherein the other type of said transducer means is a comb electrode emitter transducer, there being a plurality of emitter transducers, at least some of which have comb electrodes with reversed connections to deliver signals of opposite algebraic signs as compared with signals delivered by at least some other emitter transducers having non-reversed comb electrode connections, whereby the algebraic operations are reduced and purely arithmetic operations are increased, and means for selectively controlling the sign of a signal for inverting the sign of certain transformed terms in order to obtain the true Hadamard transform.

8. The transformation according to claim 7 and emitter transducer means mounted on said substrates in a position which is symmetrical to the position of another emitter transducer on the opposite side of said one type of said transducer means, said two symmetrical transducers delivering signals having different arithemetical signs, depending on the sign of the matrix of the transformation concerning the sample delivered by the symmetrical transducers.

9. A system for converting periodic input signals into a series of output signals which are transformed according to Hadamard transformation, said system comprising:

a. sample signal means for generating a periodic signal to drive inputs of a plurality of emitter transducer means;
b. surface wave transformer means comprising an elastic surface substrate with a receiver transducer means and a plurality of emitter transducer means serially distributed along a track across the surface of said substrate, said emitter transducers means being equally spaced at distances corresponding to the rate of said periodic signals;
c. switching means coupled to the output of said emitter transducers for individually switching said emitter transducer outputs according to any selected one of a plurality of different patterns; and
d. adding means coupled to the output of said switching means for assembling output signals of said emitter transducers in the pattern selected by said switching means, said assembled signals being a Hadamard transformation.

10. A system for converting periodic input signals into a series of output signals which are transformed according to Hadamard transformation, said system comprising:

a. sample signal means for generating a periodic signal connected to an input of an emitter transducer;
b. surface wave transformer means comprising an elastic surface substrate with said emitter transducer and a plurality of receiver transducers serially distributed along a track across the surface of said substrate, said receiver transducers being equally spaced at distances corresponding to the rate of said periodic signals;
c. switching means coupled to the output of said receiver transducers for individually switching said receiver transducer outputs according to any selected one of a plurality of different patterns; and
d. adding means coupled to the output of said switching means for assembling output signals of said receiver transducers in the pattern selected by said switching means, said assembled signals being a Hadamard transformation.

11. The system of claim 10 wherein all of said receiver transducers are mounted on said substrate on one side of said emitter transducers.

12. The system of claim 10 wherein at least a pair of said receiver transducers are mounted on opposite sides of said emitter transducer and at equal spacing therefrom.

13. The system of claim 10 or claim 18 and means for selectively changing the sign of the output signal from at least one selected receiver transducer.

14. The system of claim 13 wherein said sign-changing means is an inverter selectively connected by said switching means into a path between said selected receiver transducer and said adding means.

15. The system of claim 13 wherein said sign change means is a control circuit means coupled to the output of said adding means.

16. A signal transformation system driven by periodic sample signals which deliver an output series of signals in transformed terms, said system comprising two transformer means each including an elastic surface wave substrate having at least one transducer means of a first type and a plurality of transducer means of a second type mounted thereon to transmit signals via a single track on said elastic surface wave device, signal generator means coupled to the input of a first of said transformer means for causing one type of said transducer means on said first transformer means to transmit periodic samples of the signal to be transformed over said single track, the other type of said transducer means being arranged to receive signals from said transmitted sample signals, means for applying the output of said first transformer means to the one type of said transducer means on the second transformer means, the plurality of other transducer means on said first and second transformer means being positioned at equal distances behind one another along said track, said equal distance on the first of said transformer means being equal to the path on said track, traversed by the sample during a single period in the output of said signal generator means, said equal distance on the second of said transformer means being N-times greater than the equal distance on the first of said transformer means, algebraic adder means associated with each of said transformer means for providing a transformed term by adding output signals from the other type transducer means, switching means interposed between each of said transformer means and said adder means associated there-with for combining signals in any of many predetermined orders to create predetermined transformed output signals, the switching means selectively connecting the other type transducer means to said adder means with the algebraic signs of the additions being determined according to the coefficients of a Hadamard matrix.

* * * * *

UNITED STATES PATENT AND TRADEMARK OFFICE

CERTIFICATE OF CORRECTION

PATENT NO. : 4,245,330

DATED : January 13, 1981

INVENTOR(S) : JEAN-CLAUDE REBOURG

It is certified that error appears in the above—identified patent and that said Letters Patent is hereby corrected as shown below:

Col. 4, Line 49, "i4" (first occurrence) should be --I4--;

Col. 5, Line 22, after "35" insert --is--;

Col. 5, Line 35, "annd" should be --and--;

Col. 6, Line 23, "rack" should be --track--;

Col. 6, Line 26, "f" should be --of--;

Col. 6, Line 41, "iput" should be --input--;

Col. 8, Line 28, "width" should be --space--;

Col. 8, Line 62, "FIg" should be --FIG--;

Col. 9, Line 13, "circuit inversion" should be --inversion circuit--;

Col. 9, Line 62, "certai" should be --certain--;

Col. 10, Line 19, "FIg" should be --FIG--;

Claim 13, Line 1, "18" should be --11--.

Signed and Sealed this

*Fourth* Day of *August 1981*

[SEAL]

*Attest:*

GERALD J. MOSSINGHOFF

*Attesting Officer*

*Commissioner of Patents and Trademarks*